Dec. 10, 1935.  G. B. STANTON  2,023,860

ELECTRICAL MEASURING INSTRUMENT

Filed April 7, 1934

Witnesses:
Warren Master
Einar Medal

Inventor:
George B. Stanton

Patented Dec. 10, 1935

2,023,860

UNITED STATES PATENT OFFICE 2,023,860

ELECTRICAL MEASURING INSTRUMENT

George B. Stanton, Brooklyn, N. Y.

Application April 7, 1934, Serial No. 719,436

20 Claims. (Cl. 171—95)

The present invention relates to improvements in electrical measuring instruments and in particular an instrument adaptable to surround an electricity conductor for alternating current measurements.

An object of the invention resides in a novel construction of coil wound magnetic members, said members pivotally connected and in spaced relation to an electricity conductor.

A further object of the invention resides in a novel construction of the indicating device, said device having a movable coil removably and adjustably disposed in the magnetic path of the magnetic members and energized by the current in the magnetic member coil.

A further object of the invention resides in a novel method of range changing by means of calibrating shunt resistances across the movable coil, and series resistances in the electrical circuit.

A further object of the invention resides in a novel method of range changing by adjustably disposing a portion of the indicating device for varying the reluctance of the magnetic path of the magnetic member.

A further object of the invention resides in a novel method of obtaining instrument deflections by directly short circuiting the movable coil of the indicating member disposed in the magnetic path of the magnetic members.

A further object of the invention resides in a novel construction of the magnetic member pole-pieces, whereby said pole-pieces and the indicating member may be pivoted to any angular position relative to the magnetic member.

With the above and other objects in view, reference will be had to the following, where;

Figure 1:
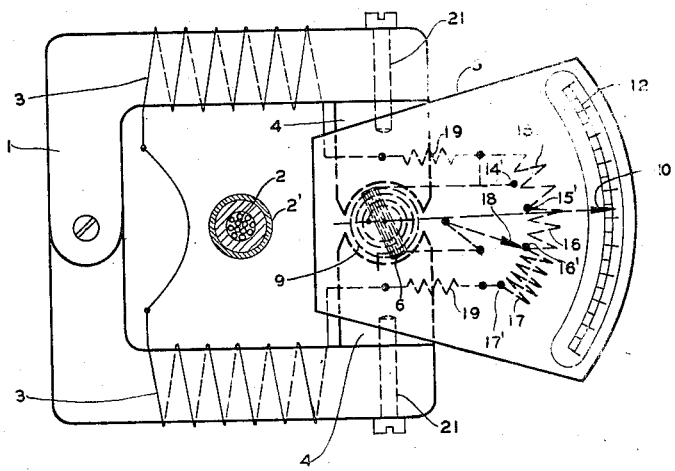
Fig. 1 is a general arrangement of the instrument.
Figure 2:
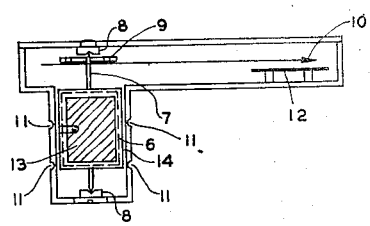
Fig. 2 is a preferred arrangement of the indicating member or device.

Referring more particularly to the figures, part 1 alludes to a pivotally mounted magnetic member adapted to surround an electricity conductor. Magnetic member 1 terminates to pivotable pole-pieces 4 having an air gap in the magnetic path for the introduction of the movable coil 6 of the indicating device 5. Pole-pieces 4 and 6 of the indicating device 5, are pivotable about pivots 21 or the like.

When an alternating current flows in a conductor 2, the magnetic flux around said conductor induces an alternating current in the coil or winding 3 of the magnetic member 1.

Before my invention, it has been a common practice to supply this induced alternating current to distant indicating instruments in order to determine the magnitude of the alternating current in the conductor 2.

In my present invention, the induced alternating current is supplied directly to an indicating device 5, and whose movable coil 6 is adjustably disposed in an air gap and within the magnetic path of the magnetic member of the instrument.

Movable coil 6 is mounted on a shaft 7, and rotatable with said shaft on bearings 8 or the like. A pointer 10, mounted on the movable coil shaft, is retained at an arbitrary position relative to the graduated scale 12, by means of spring or the like 9.

Means is provided to retain coil 6 at predetermined positions within the air gap for adjustable calibrations of the instrument, and in the present invention said means consist of engaging recesses 11 and springs or the like 20.

The torque, rotating coil 6, is furnished by the flux in the air gap and the current in the coil 6. Current in coil 6 obtainable by electrically connecting said coil to windings 3, where a current is induced by the magnetic member 1, or by directly short circuiting said coil and whereby inducing a current directly from the flux in the magnetic path of member 1.

When a conductor carries alternating currents, measuring devices based on current transformers and auxiliary ammeters, rely on the induced secondary currents in the transformer windings to energize a stationary field coil of the indicating meters.

But when a conductor carries superposed direct and alternating currents, no provision has been made to compensate the effect of direct current on the transformer, and the resulting erratic indications of the auxiliary ammeters. The presence of direct current in the conductor 2, and/or in the metallic sheath around the insulation, shown as 2', creates a separate magnetic field in addition to the field due to the alternating current. One effect of this direct current field will be the tendency to saturate the transformer core and/or affect its ratio. For I have discovered that an ammeter connected to a transformer secondary indicates a different value of the alternating current in the conductor, when direct and alternating currents are superposed in said conductor, and if the effective value of the alternating component remains constant, the ammeter indications vary depending on the magnitude of the direct current component.

Also, devices devoid of winding and relying solely on the magnetic induction, are energized by the vector sum of the direct and alternating currents, and hence their indications are functions of the effective values of the superposed direct and alternating currents, and thus they are unsuitable for the measurement of the alternating component when said devices are adapted to surround a conductor of superimposed currents.

In the present invention the effect of direct current on the windings is substantially compensated, by causing the magnetic field to act on a movable coil of the indicating device disposed in the magnetic path of the magnetic member, by mounting said coil adjustably within the pole-pieces and under influence of the superposed direct and alternating current fields.

Thus, although the presence of the direct current in the conductor 2 affects the induced alternating current in the windings 3 of the magnetic member 1, the additional direct current flux in the magnetic path of the magnetic member is caused to exert a torque on the movable coil 6 of the indicating member 5. The superposed direct current lowers the indications of the indicating member by an amount proportional to the square root of the direct current. Hence by suitably proportioning the indicating member elements, the effect due to the direct currents can be taken care of and compensated.

To reduce the reluctance of the air gap, a stationary armature 13 is mounted in a tubular portion 14 of the indicating member 5, and within the movable coil 6, allowing space for the free rotation of said coil in the tubular portion.

It will be noticed that this armature is removable from the air gap, and its position therein depends on the depth of introduction of the tubular portion 14 of the indicating member 5. Indicating member 5 is slidably and adjustably mounted in the magnetic path of the magnetic members, and its position relative to the magnetic members depends on the position of the tubular portion 14 in the air gap of the magnetic members.

Pole-pieces 4, defining the position of the air gap in the magnetic path, are rotatably mounted relative to the body of the magnetic members, and in the present embodiment of the invention they can be pivoted to any angle relative to said members, by mounting said pole-pieces on pivots 21.

Figure 4:
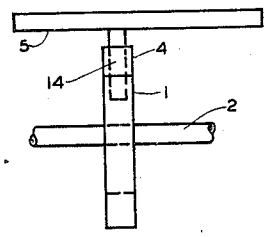
Fig. 4 shows the disposition of the pole-pieces and the indicating device pivoted to a plane perpendicular to that of the magnetic member.
Figure 3:
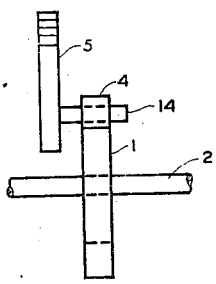
Fig. 3 shows the disposition of the pole-pieces and the indicating device pivoted to a plane parallel to that of the magnetic member.

Thus the general plane of the indicating member 5 may be disposed at any angle, and hence the scale plate 12 of the indicating member may be disposed either parallel or perpendicular to the general plane of the magnetic member, as in Figures 3 and 4 respectively.

When the order of magnitude of the current in conductor 2 is unknown, movable coil 6 is directly short-circuited, and normally retained in said position by spring or the like 23. In this case, deflections of the instrument are obtained by a torque due to the field in the air gap and the field due to the induced current in the movable coil by said field in the air gap, but without being energized by the winding 3 of the magnetic member and/or connected to the same. Range changing and adjustable calibrations are obtainable by slidably disposing coil 6 at predetermined steps in the air gap.

Several range changing shunts are adapted to be disposed across the movable coil 6, affording another means for adjustable calibrations and range changing of the instrument.

It is thus apparent that the presence of shunting resistance units across the movable coil may serve as a means of range changing and independent of the depth of introduction of the movable coil in the air gap of the magnetic members.

Several taps may be taken out of the winding 3 of the magnetic member to utilize said taps for range changing and independent of other means.

By "instrument range" is referred to the calibrated motion of the indicator from the rest position to the maximum deflection of the same, and "multiplicity of instrument ranges" is referred to a plurality of maximum deflections of the indicator, wherein said deflections are various multiples of the lowest calibrated range.

Means is provided for selective range changing, and in the present embodiment of the invention said means consists of a slidable selector 18 for introducing in the movable coil circuit any desired range changing point, and said selector normally retained on the highest range point by means of spring 23 or the like. When the indicating member is removed from the air gap of the magnetic member 1, range changing shunts remain in the circuit of winding 3 and form an integral part of said circuit. Leads from said shunts terminate to insulated terminals 34, 35, 36 and 37 suitably mounted on the magnetic member, and by means of spring contacts 24, 25, 26 and 27 mounted on the indicating member, lead the voltage drop across the shunts to contact points 15', 16' and 17', and through range selector 18 to the movable coil 6.

Figure 5:
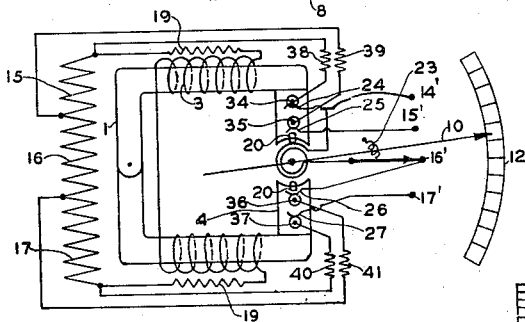
Fig. 5 represents a preferred general diagram of the complete instrument.

Series calibrating resistances 19 are provided in the circuit of the indicating member coil 6, and/or in series with winding 3 of the magnetic member as shown by resistances 38, 39, 40 and 41 in Fig. 5.

Another method of calibration may be effected by adjusting the number of turns of winding 3 of the magnetic member 1, independent of other calibrating means.

Thus a complete adjustable calibration is obtainable by:

The range changing shunts and their series resistances.

The series resistances in circuit with the movable coil.

The number of turns of winding 3 of the magnetic member 1, and,

The depth of introduction of the tubular member 14, in the magnetic path of the magnetic member 1.

While the invention has been herein disclosed in a preferred form, it is to be understood that the invention is not to be limited to the specific construction herein illustrated and that it may be practiced in other forms without departing from the spirit thereof.

Having thus described the invention, what is claimed as new and what is desired to secure by Letters Patent of the United States, is:

1. An electrical measuring instrument comprising pivotally connected magnetic members having a winding thereon, an indicating device provided with a tubular portion, a movable coil in said portion and in the magnetic path of said members, said movable coil and tubular portion being slidably and removably mounted in the magnetic path of the magnetic members.

2. An electrical measuring instrument comprising coil wound magnetic mmebers terminating in pole-pieces, an indicating device provided with a tubular portion, a movable coil in said portion, said indicating device and tubular portion being adjustably and slidably mounted between the pole-pieces of said magnetic members.

3. An electrical measuring instrument comprising coil wound pivotally connected magnetizable members having an air gap in the magnetic path thereof, said members being disposed about an electrical conductor, an indicating device provided with a tubular portion, a shaft in said portion, a coil on said shaft and rotatable with the shaft, said coil and tubular portion being adjustably and removably mounted within the air gap of the magnetizable members.

4. An electrical measuring instrument comprising coil wound magnetizable members, an electrical indicating device having a coil rotatably disposed in the magnetic path of said members, range changing shunts in said rotatable coil circuit and said coil being slidably and removably mounted in the magnetic path of the magnetizable members.

5. An electrical measuring instrument comprising a magnetic member having a winding thereon and being disposed in spaced relation to an electricity conductor, an indicating device provided with a movable coil being disposed in the magnetic path of said member, range changing shunt resistances across said movable coil, said movable coil being electrically connected to the magnetic member winding through said shunts.

6. An electrical measuring instrument comprising a magnetic member having a winding thereon, an indicating device provided with a movable coil connected to said winding and being disposed in the magnetic path of the magnetic member, said magnetic member, the winding thereon and said indicating device being magnetically and inductively coupled to the flux supplied by the current in a conductor.

7. An electrical measuring instrument comprising pivotally connected magnetic members having a winding thereon, said members adaptable to be disposed in spaced relation to an electrical conductor, an indicating device provided with a movable coil connected to said winding and positionable in the magnetic path of said members, said members and indicating device being magnetically and inductively coupled to the flux supplied by the current in the conductor.

8. An electrical measuring instrument for use in a field of force produced by direct and alternating components of an electrical quantity, an electrical indicator positionable in said field of force, means for supporting said indicator in said field of force at predetermined positions said instrument being adapted to measure substantially the alternating component of said electrical quantity.

9. An alternating current instrument comprising a member for producing an electromagnetic field, an indicating device positionable in said field and actuated by the magnetic flux of said field, said member being inductively coupled to the flux produced by the current in an electrical conductor, said instrument being adapted to measure substantially the alternating component of an electrical quantity composed of superposed direct and alternating currents.

10. In an alternating current instrument, a magnetic member, a winding thereon, calibrating shunts across said winding and provided with range selecting taps, series resistances in circuit with said winding and the shunts, and means for selective range changing.

11. The invention as set forth in claim 10, wherein said means comprise a movable contactor for selecting said shunt taps.

12. The invention as set forth in claim 10, and in combination a movable coil connected to said shunts through a range selecting contactor.

13. In an alternating current instrument stationary means for obtaining a field of force, a movable coil indicating device, and means engaging said indicating device in said field of force at predetermined positions for calibration of the instrument said coil being short-circuited in said field of force for obtaining higher instrument ranges.

14. The invention as set forth in claim 13, wherein said movable coil is inclosed in a tubular housing.

15. An electrical instrument comprising a magnetizable member having a winding thereon, a movable coil being disposed in the magnetic path of said member and energized solely by the induced currents in said winding, said magnetizable member, the winding thereon, and the movable coil in the magnetic path thereof being inductively coupled to the flux produced by the current in a conductor.

16. An alternating current instrument comprising a magnetic member having a winding thereon, said member being inductively coupled to the flux produced by the current in a conductor, a movable coil being in the magnetic path of said member, said coil being electrically energized by the induced currents in said winding and being magnetically actuated by the magnetic flux of said member.

17. In an alternating current instrument, an electromagnetic field member, a coil rotatable in the field of force of said member, means for directly short-circuiting said coil for obtaining higher instrument ranges said short-circuited coil being energized by the induced currents in said field.

18. In an alternating current instrument, a stationary field member, an indicating device provided with a tubular portion housing a core and a coil rotatable around said core, said coil being disposed in the magnetic field of said member and being short-circuited in said magnetic field for obtaining higher range instrument deflections.

19. In an electrical instrument, a stationary magnetic member, an indicating device provided with a core, a coil movable around said core, said coil being short-circuited and disposed in the magnetic path of said member for obtaining higher range deflections, said deflections being obtained by the magnetic field of said member and the currents induced in said coil in the magnetic path thereof.

20. In an electrical measuring instrument, a coil wound field structure for producing a field of force, an indicating device positionable in said field of force at predetermined positions, and means engaging said indicating device in said positions.

GEORGE B. STANTON.